United States Patent [19]

Banners et al.

[11] 3,901,272
[45] Aug. 26, 1975

[54] UNIDIRECTIONAL FLOW CONTROL VALVE

[75] Inventors: Delbert J. Banners, Plymouth; Calvin J. Simmons, Madison Heights, both of Mich.

[73] Assignee: Ford Motor Company, Dearborn, Mich.

[22] Filed: Jan. 4, 1974

[21] Appl. No.: 430,976

[52] U.S. Cl. ............ 137/513.5; 137/525.1; 138/45
[51] Int. Cl.² ........................................ F16K 15/16
[58] Field of Search........... 137/513.3, 513.5, 525.1, 137/512.4; 138/45

[56] References Cited
UNITED STATES PATENTS

| | | | |
|---|---|---|---|
| 2,082,972 | 6/1937 | Perry | 137/525.1 X |
| 2,829,674 | 4/1958 | Segelhorst et al. | 138/45 |
| 3,324,877 | 6/1967 | Bochan | 137/512.4 |
| 3,419,038 | 12/1968 | Andersen | 137/513.5 X |
| 3,822,720 | 7/1974 | Souza | 137/525.1 |

FOREIGN PATENTS OR APPLICATIONS 545,168  10/1922  France ........................... 251/149.4

Primary Examiner—Alan Cohan
Assistant Examiner—Gerald A. Michalsky
Attorney, Agent, or Firm—Robert E. McCollum; Keith L. Zerschling

[57] ABSTRACT

A unidirectional controlled flow valve has a flexible duckbill-like portion with a slit through which a wire projects to define small controlled flow areas between the wire and slit when the duckbill-like portion is closed by higher pressure forces external of the portion than internal, and free flow in the opposite direction through the open slit when the pressure conditions are reversed.

1 Claim, 3 Drawing Figures

PATENTED AUG 26 1975  3,901,272

UNIDIRECTIONAL FLOW CONTROL VALVE

The invention relates in general to a valve construction, and more particularly to one in which a controlled bleed is provided for flow of vacuum in one direction, while free flow is permitted in the opposite direction.

One-way check valves, flow restrictors, etc., are known for delaying or preventing the flow of a fluid in one direction or the other for various purposes. For example, in motor vehicle type carburetors, one-way delay devices may be used to delay the application of vacuum to a choke pulloff device, for example, so that the choke is only slowly opened. On the other hand, the device working in the opposite direction permits free flow so that the choke can recycle quickly when the engine is shut off.

This invention relates to a vacuum flow bleed valve construction that is simple in construction and economical to manufacture, with a minimum of parts.

It is an object of the invention to provide a vacuum bleed valve construction that will provide a controlled flow in one direction and free flow in the opposite direction, with a minimum of movable parts.

It is another object of the invention to provide a vacuum flow bleed valve construction consisting of an elastomeric member Having a duckbill-like portion projecting from one side and located in a vacuum passage to control the flow of vacuum through the passage, the duckbill-like portion being flexible and having a slit through it that is normally closed by pressure external of the duckbill-like portion acting on it at a level higher than that acting internally; free flow being permitted, however, whenever the pressure conditions are reversed; a valve construction further containing a wire member projecting through the slit to deform it and provide a controlled area between the slit and wire through which vacuum may pass at all times.

Other objects, features, and advantages of the invention will become more apparent upon reference to the succeeding detailed description thereof, and to the drawings illustrating the preferred embodiment thereof, wherein.

Figure 1:
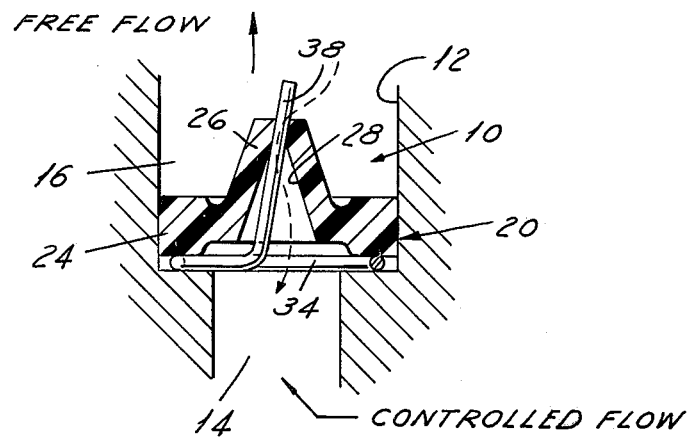
FIG. 1 is a cross-sectional view of a vacuum passage including a valve constructed according to the invention.
Figure 2:
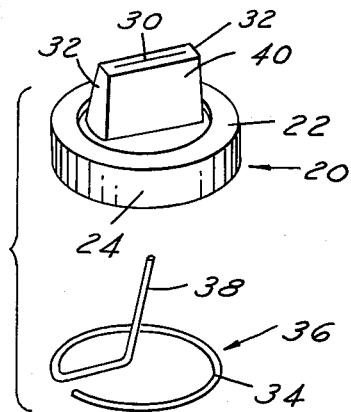
FIG. 2 is an exploded perspective view on a reduced scale of portions of the FIG. 1 showing; and, FIG. 3 is a perspective view of a portion of the parts of FIG. 1.

FIG. 1 shows a vacuum passage 10 having a stepped diameter bore 12 providing larger and smaller diameter portions 16 and 14, respectively. Seated within the larger bore portion 16 is a valve member 20 controlling flow between the two bore portions.

More specifically, the valve comprises an elastomeric member 22 having an annular base portion 24 seated in bore portion 16. Formed integral with the base portion is a duckbill-like portion 26 that tapers in an axial direction, as shown. The duck bill-like portion is comparable to a central sleeve squashed at one end to provide an internally tapering hollow bore section 28. The integral end portion of the conical-like projecting portion, as seen in FIG. 1, has a longitudinal slit 30 that extends axially through the thickness of the material to the hollow interior. The slit terminates radially short of the side edge portions 32 to define a controlled area for communication of vacuum through the slit between opposite sides of the valve.

Figure 3:
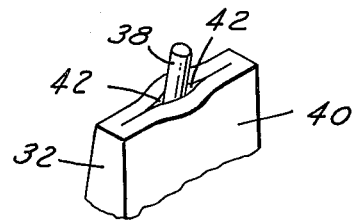

The base portion 22 of the valve presses against and retains the single coil portion 34 of a round wire 36. It has an upstanding portion 38 that is adapted to project through the slit 30 as shown in FIGS. 1 and 3. Projection of portion 38 through the slit deforms the flap-like portion 40 to the shape shown in FIG. 3 providing small bleed areas 42 on opposite sides of wire portion 38. Thus, projection of the wire through the slit maintains communication of vacuum between the two sides of the duckbill-like portion at all times.

In operation, therefore, when the vacuum in passage portion 14 is at a lower pressure level than that in passage portion 16, the higher pressure acting against the outside or external surfaces of the duckbill-like portion 26 will maintain the slit 30 closed around the wire 42 so that only a controlled flow of vacuum can occur from portion 16 to portion 14, as indicated by the arrows in FIG. 1. On the other hand, when the vacuum in passage portion 14 is at a higher pressure level than that in portion 16, the higher pressure acting internally of the duckbill-like portion 26 will cause the flap-like portions 40 to move radially outwardly towards the wall of the passage and thereby provide a free flow of vacuum from portion 14 to portion 16.

From the foregoing, therefore, it will be seen that the valve constructed according to the invention provides a readily obtainable small flow area, and one that can be changed easily by varying the diameter of the wire projecting through the duckbill-like portion; or by varying the pressure differential on opposite sides of the valve to determine the collapse of the duckbill-like portion on the wire projecting through it. It will also be seen that the valve is self-cleaning during free flow operation, that it is very simple in construction with esentially no movable parts, and that what parts are present are easily and economically replacable.

While the invention has been described and illustrated in its preferred embodiment, it will be clear to those skilled in the arts to which it pertains that many changes and modifications may be made thereto without departing from the scope of the invention. For example, other cross-sectional shapes could be used in place of the round wire described.

We claim:

1. A unidirectional vacuum bleed valve for use in a vacuum passage comprising an annular one-piece elastomeric member having a base portion retained against a portion of the passage and an upstanding duckbill-like portion tapering in an axial direction, the duckbill-like portion having a slitted opening that is normally closed by a higher pressure level existing externally of the duckbill-like portion than internally while also opening in response to a higher pressure internally than externally to provide free communication of vacuum to opposite sides of the duckbill-like portion, and a wire member having a base portion retained between the passage portion and the base portion of the elastomeric member and a second upstanding portion projecting through the slit to deform the slit to provide controlled vacuum bleed areas between the wire and slit portions engaged therewith when the pressure is higher externally of the duckbill-like portion than internally.

* * * * *